United States Patent [19]

Naito et al.

[11] Patent Number: 5,248,259
[45] Date of Patent: Sep. 28, 1993

[54] ELECTRIC CONNECTOR FOR USE WITH AUTOMOTIVE SLIDE DOOR

[75] Inventors: Ichiro Naito; Jun Yamagishi, both of Yokohama, Japan

[73] Assignee: Ohi Seisakusho Co., Ltd., Yokohama, Japan

[21] Appl. No.: 876,782

[22] Filed: Apr. 30, 1992

[30] Foreign Application Priority Data

Apr. 30, 1991 [JP] Japan .............................. 3-30150[U]

[51] Int. Cl.⁵ ............................................. H01R 33/00
[52] U.S. Cl. ....................................... 439/34; 439/700
[58] Field of Search ................. 439/34, 181, 185, 187, 439/700

[56] References Cited

U.S. PATENT DOCUMENTS 3,196,228  7/1965  Colenutt .................... 439/181 X
3,723,724  3/1973  Appleton .................... 439/181 X

FOREIGN PATENT DOCUMENTS 37-322779  12/1962  Japan .
1-164647   6/1989  Japan .
21480     of 1914  United Kingdom ................ 439/700

Primary Examiner—Eugene F. Desmond
Attorney, Agent, or Firm—Foley & Lardner

[57] ABSTRACT

An electric connector for use with an automotive slide door is shown, which comprises a first connector part adapted to be mounted to a vehicle body and a second connector part adapted to be mounted to the door. The first connector part includes a first nonconducting casing, a first conducting contact pin axially movably received in the first casing, a conducting piece axially movably received in the first casing in front of the first contact pin, and a spring for biasing the conducting piece in a direction away from the first contact pin. The second connector part includes a second nonconducting casing and a second conducting contact pin carried by the second casing. When the door is manually moved in a closing direction to a slightly open given position, an exposed end of the second contact pin contacts and pushes the conducting piece toward the first contact pin against the force of the biasing means and finally brings the conducting piece into contact with the first contact pin.

9 Claims, 9 Drawing Sheets

ELECTRIC CONNECTOR FOR USE WITH AUTOMOTIVE SLIDE DOOR

BACKGROUND OF THE INVENTION

1. Field of the Invention

The present invention relates in general to electric connectors for use with an automotive slide door and more particularly to electric connectors of a type which comprises a first connector part mounted to the slide door and a second connector part mounted to the vehicle body, so that upon closing of the door, the first and second connector parts become mated to achieve an electric connection therebetween.

2. Description of the Prior Art

In Japanese Patent First Provisional Publication No. 1-164647, there is shown an electric lock system of an automotive slide door, which comprises an electrically actuated lock device mounted to a slide door and a striker secured to a vehicle body. When the slide door is moved in a closing direction by a manual labor to an almost closed given position at which a latch member of the lock device makes a so-called "half-latch engagement" with the stroker, the latch member is driven, by an electric drive means mounted in the door, to its fully latching position thereby to lock the door at a fully closed position.

In order to feed the electric drive means with an electric power from a battery mounted in the vehicle body, an electric connector is used, which comprises a first connector part mounted to the vehicle body and connected through electric cables to the battery and a second connector part mounted to the slide door and connected through electric cables to the electric drive means, so that upon reaching of the door to the almost closed given position, the first and second connector parts are coupled to achieve an electric connection therebetween thereby to feed the electric drive means with electric power.

However, in the electric connectors of the type mentioned hereinabove, it is difficult to obtain assured and stable electric connection between the first and second connector parts due to their inherent constructions. Furthermore, the first connector part tends to encounter a short-circuit due to naked arrangement of contact pins installed therein.

SUMMARY OF THE INVENTION

It is therefore an object of the present invention to provide an electric connector for use with an automotive slide door, which is free of the above-mentioned drawbacks.

According to a first aspect of the present invention, there is provided an electric connector for use with first and second structures which are movable relative to each other. The electric connector comprises a first connector part adapted to be mounted to the first structure, the first connector part including a first nonconducting casing, a first conducting contact pin axially movably received in the first casing, a conducting piece axially movably received in the first casing in front of the first contact pin, and biasing means for biasing the conducting piece in a direction away from the first contact pin: and a second connector part adapted to be mounted to the second structure, the second connector part including a second nonconducting casing, and a second conducting contact pin carried by the second casing, wherein when the first and second connector parts approach each other, an exposed end of the second contact pin contacts and pushes the conducting piece toward the first contact pin against the force of the biasing means and finally brings the conducting piece into contact with the first contact pin.

According to a second aspect of the present invention, there is provided an electric connector which is used in a motor vehicle which includes a vehicle body, a slide door, a battery mounted in the vehicle body and an electric device mounted in the slide door. The electric connector comprises a first connector part adapted to be mounted to the vehicle body, the first connector part including a first nonconducting casing, a first conducting contact pin axially movably received in the first casing, a conducting piece axially movably received in the first casing in front of the first contact pin, and biasing means for biasing the conducting piece in a direction away from the first contact pin; and a second connector part adapted to be mounted to the slide door, the second connector part including a second nonconducting casing, and a second conducting contact pin carried by the second casing, wherein when, due to a closing movement of the slide door, the second connector part approaches the first connector part, an exposed end of the second contact pin contacts and pushes the conducting piece toward the first contact pin against the force of the biasing means and finally brings the conducting piece into contact with the first contact pin.

BRIEF DESCRIPTION OF THE DRAWINGS

Other objects and advantages of the present invention will become apparent from the following description when taken in conjunction with accompanying drawings, in which.

DETAILED DESCRIPTION OF THE INVENTION

In the following, the present invention will be described in detail with reference to FIGS. 1 to 10.

Figure 5:
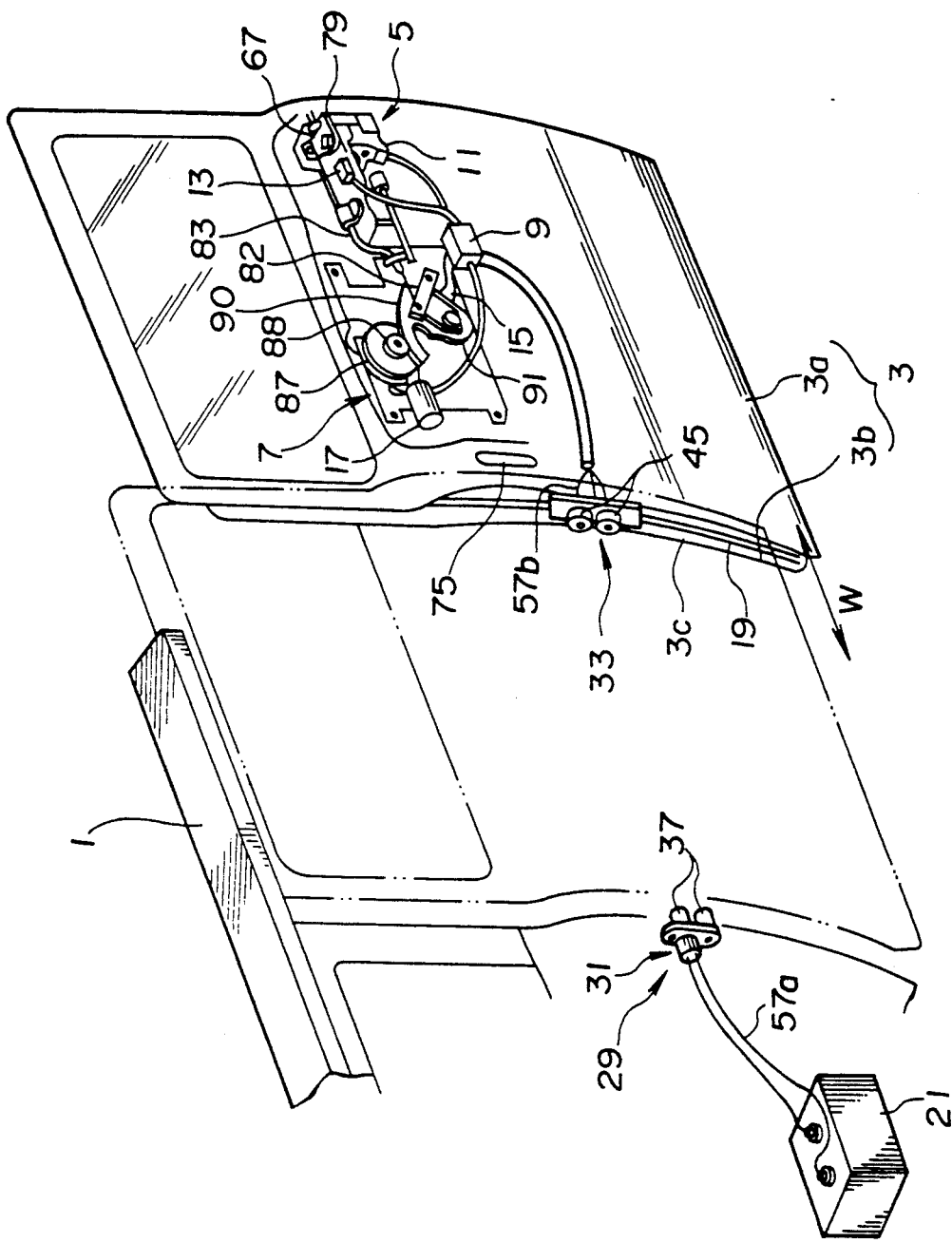
FIG. 5 is a perspective view of an automotive slide door to which the present invention is applied.

Referring to FIG. 5, there is shown an automotive slide door 3 to which an electric connector of the present invention is practically applied. The slide door 3 is slidably mounted to a side wall of a vehicle body 1. The slide door 3 comprises generally an outer panel 3a and an inner panel 3b which are united. The arrow "W" shows the direction in which the door 3 slides when closing of the door 3 is required.

The slide door 3 is equipped with a door lock device 5, an electric drive mechanism 7 and a control device 9 which will be described in detail hereinafter. The control device 9 is connected through electric cables to a half-latch detecting switch 11, a full-latch detecting switch 13, an original position detecting switch 15, an electric motor 17 and a safety switch 19. The safety switch 19 is a pressure sensitive switch which is mounted to a front end 3c of the door 3.

A battery 21 is mounted in the vehicle body 1.

Designated by numeral 29 is an electric connector of the present invention, which comprises a first connector part 31 mounted to a pillar 1a of the vehicle body 1 and a second connector part 33 mounted to the front end 3c of the door 3. These first and second connector parts 31 and 33 are positioned and arranged to face each other.

Figure 1:
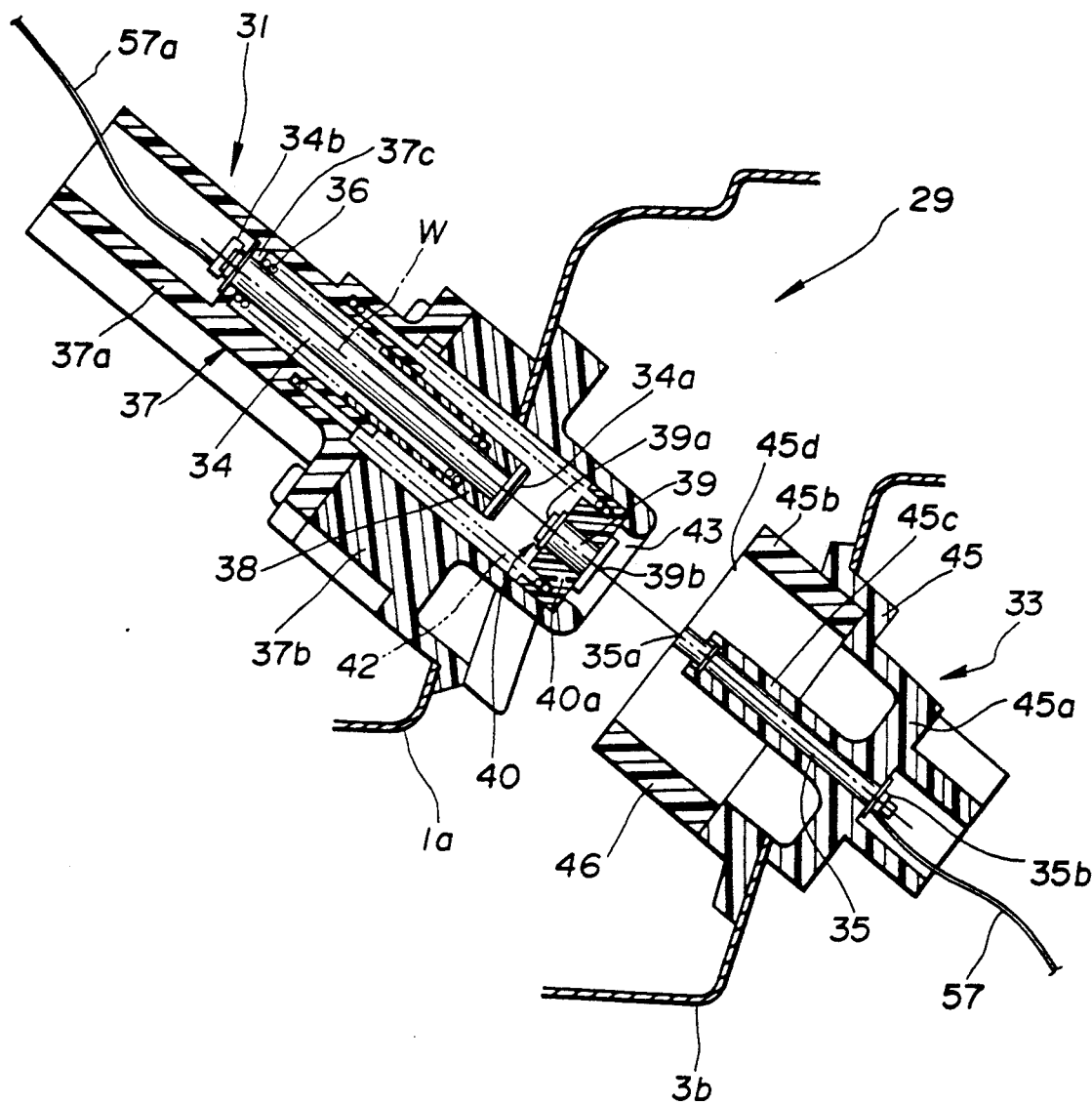
FIG. 1 is a sectional view of an electric connector of the present invention, showing a condition wherein first and second connector parts are kept separated.

As is seen from FIG. 1, the first connector part 31 comprises a casing 37 of nonconducting material which consists of two parts 37a and 37b. The casing 37 is formed with two parallel bores each having a base wall 37c which defines a rear end of the bore.

Two first conducting contact pins 34 are axially slidably disposed in the parallel bores of the casing 37. Each first contact pin 34 has a rear end slidably passed through an opening formed in the base wall 37c. Each contact pin 34 has a front half portion spacedly disposed in a nonconducting sleeve 38 which is fixed to an enlarged head 34a of the pin 34. Thus, the contact pin 34 and the sleeve 38 move as a unit.

A first spring 36 is disposed about each pin 34 and compressed between the base wall 37c and the enlarged head 34a. Thus, the first contact pins 34 are constantly biased in a direction to project outward, that is, rightward in FIG. 1. For preventing disengagement of the contact pins 34 from the bores of the casing 37, each pin 34 has at a rear end a stopper 34b which abuts against a rear surface of the base wall 37c of the bore.

The first connector part 31 further comprises two cylindrical pieces 39 of conducting material. Each piece 39 is held by an annular slider 40a of nonconducting material to form a slidable terminal 40. As is seen from the drawing, the cylindrical piece 39 has rear and front ends 39a and 39b exposed from the annular slider 40a. The front end 39b is larger than the rear end 39a. These two slidable terminals 40 are axially slidably received in the parallel bores of the casing 37 in front of the corresponding first contact pins 34.

A second spring 42 is compressed between a stepped part of each bore and the slidable terminal 40. Thus, the slidable terminals 40 are constantly biased in a direction to project outward, that is, rightward in FIG. 1. For suppressing disengagement of the slidable terminals 40 from the bores, each bore has a mouth 43 of smaller diameter.

As is seen from FIG. 1, in a rest condition of the first connector part 31 wherein no external force is applied to the slidable terminals 40, each first contact pin 34 and the corresponding slidable terminal 40 are urged to assume their most projected positions while keeping a given space therebetween.

As will become apparent as the description proceeds, when a certain external force due to coupling of the first and second connector parts 31 and 33 is applied, the slidable terminal 40 moves to abut against the enlarged head 34a of the first contact pin 34 and finally pushes the same rearward (that is, leftward in FIG. 1) against the biasing force of the second and first springs 42 and 36.

The second connector part 33 comprises a casing 45 of nonconducting material which consists of two parts 45a and 45b. The casing 45 is formed with two hollow columns 45c each extending from a bottom of the casing 45 to a position just below a front end of a mouth 45d of the casing 45. Each column 45c has a second conducting contact pin 35 fixedly received therein. Each second contact pin 35 has front and rear ends 35a and 35b projected outward from the corresponding column 45c.

As will be understood from FIGS. 1 and 5, a first group of electric cables 57a extend from the first contact pins 34 of the first connector part 31 to the battery 21 mounted in the vehicle body 1, and a second group of electric cables 57b extend from the second contact pins 35 of the second connector part 33 to the control device 9 mounted in the slide door 3.

Figure 3:
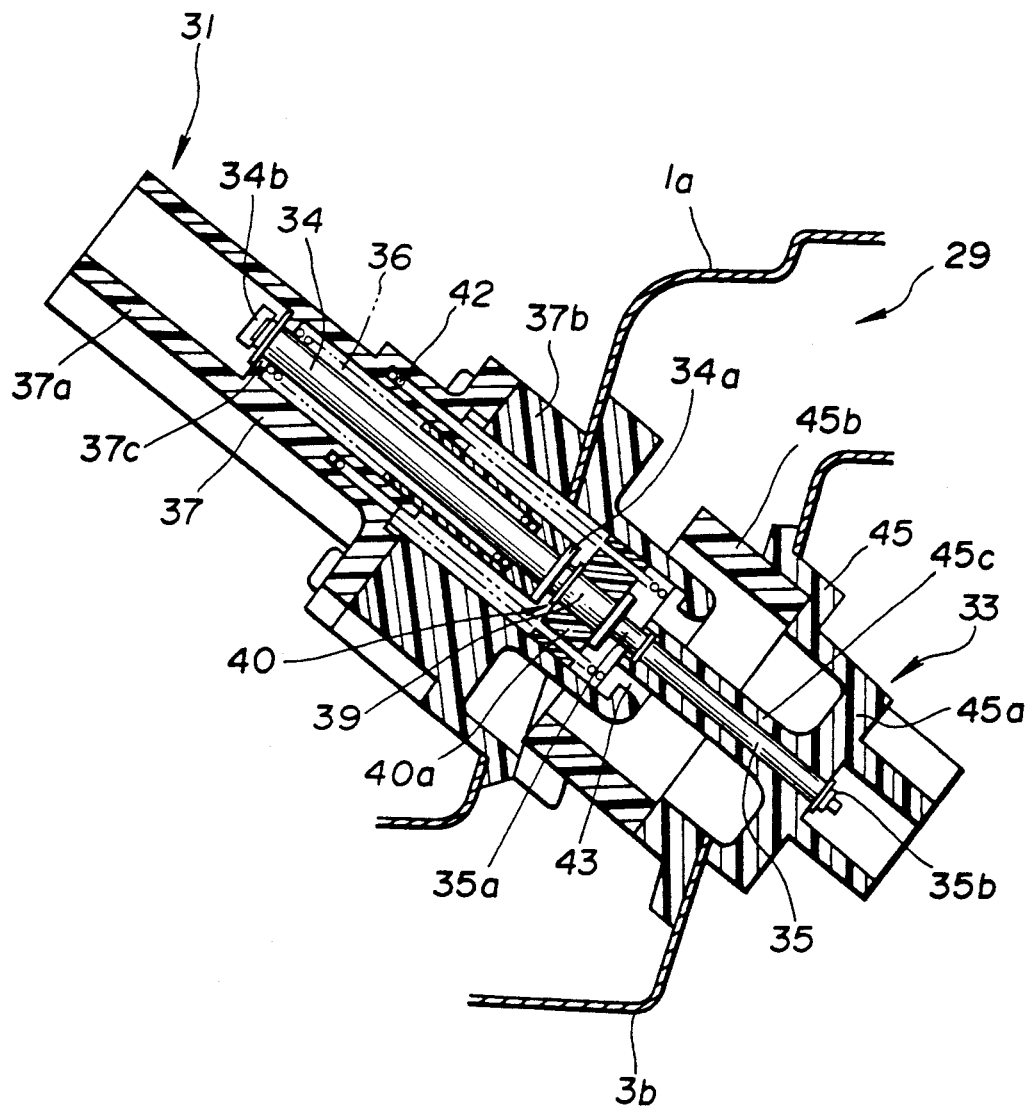
FIG. 3 is a view similar to FIG. 1, but showing a condition taken when an associated door lock device assumes a half-latch condition.
Figure 4:
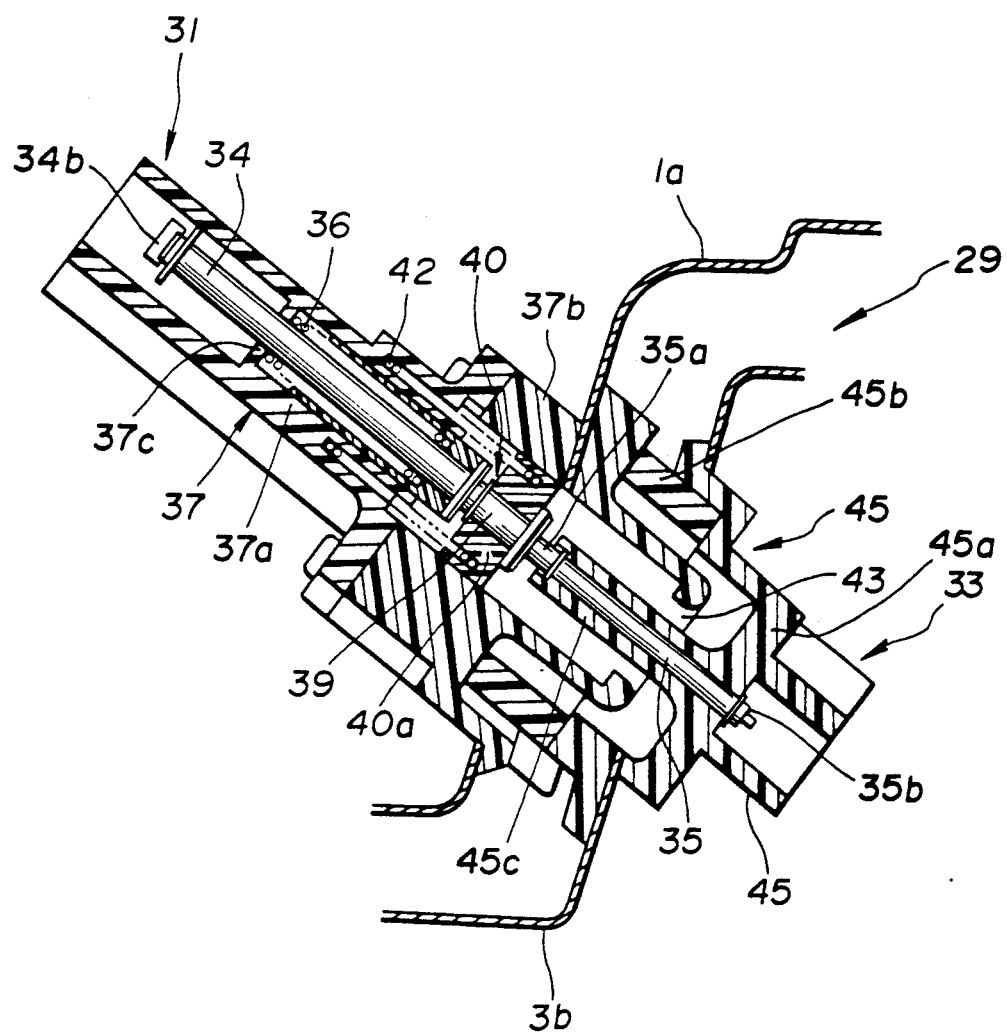
FIG. 4 is a view also similar to FIG. 1, but showing a condition taken when the door lock device assumes a full-latch condition.

As will be described in detail hereinafter, when the slide door 3 is moved in a closing direction to an almost closed given position at which the door lock device 5 assumes its half-latch condition, the electric connector 29 assumes an ON condition as shown in FIG. 3 wherein the first contact pins 34 of the first connector part 31 are connected to the second contact pins 35 of the second connector part 33 through the cylindrical pieces 39 thereby to achieve an electric connection therebetween. Upon this connection, electric power feeding from the battery 21 to the control device 9 is ready.

Figure 6:
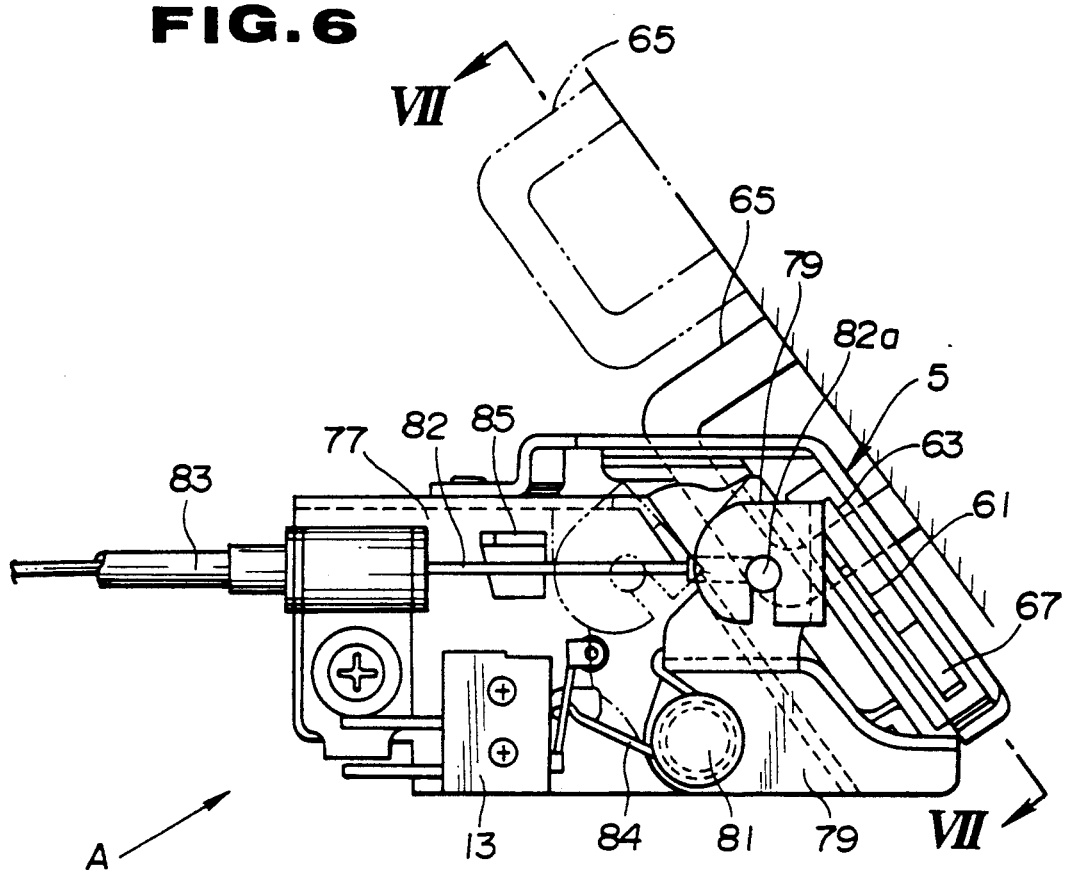
FIG. 6 is a sectional view of the door lock device, showing a condition wherein a latch member of the device is engaged with a striker.
Figure 7:
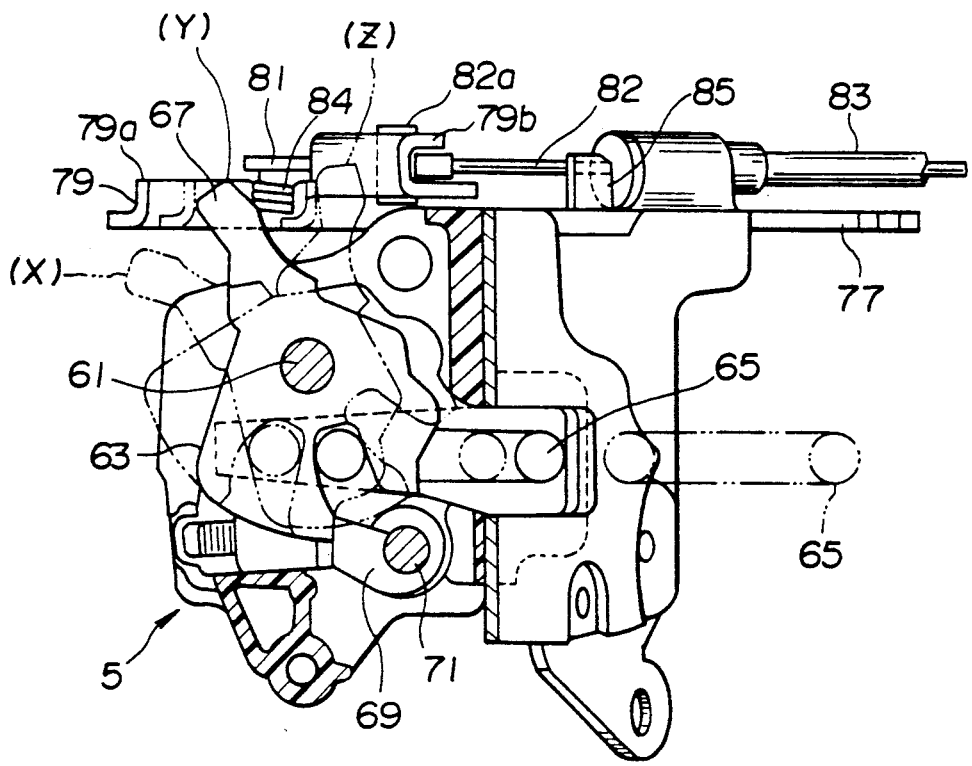
FIG. 7 is a sectional view taken along the line VII—VII of FIG. 6.

As is seen from FIG. 6, the door lock device 5 is mounted to a rear part of the door 3, and as is seen from FIG. 7, the lock device 5 comprises a latch member 63 which is pivotally connected to the door 3 through a pivot shaft 61 which extends perpendicular to a surface of the front end 3c of the door 3. The latch member 63 is arranged and constructed to be latchingly engageable with a striker 65 (see FIG. 6) which is secured to the vehicle body 1 near a rear end of the door opening. As is seen from FIG. 7, in response to movement of the slide door 3, the latch member 63 is pivoted about the pivot shaft 61 to assume a release position "X" wherein the latch member 63 releases the striker 65, a half-latch position "Y" wherein the latch member 63 half engages with the striker 65 and a full-latch position "Z" wherein the latch member 63 fully engages with the striker 65. When the latch member 63 assumes the full-latch position "Z", the slide door 3 is locked at its fully closed position.

The latch member 63 is formed with an arm portion 67 which extends radially outward, that is, upward in FIG. 7.

Designated by numeral 69 is a pawl member which is integral with a shaft 71. The shaft 71 is in parallel with the pivot shaft 61. When the pawl member 69 assumes a block position as shown in FIG. 7. a counterclockwise turning of the latch member 63 from the half-latch or full-latch position "Y" or "Z" is suppressed. When the pawl member 69 is turned in a counterclockwise direction from the block position to a release position, the counterclockwise turning of the latch member 63 from the half-latch or full-latch position "Y" or "Z" is permitted. When the latch member 63 assumes the release position "X", the pawl member 69 rides on a peripheral wall of the latch member 63, assuming a position near the release position. Accordingly, the release position of the pawl member 69 is taken only when the latch member 63 assumes either one of the half-latch position "Y" and the full-latch position "Z".

Figure 8:
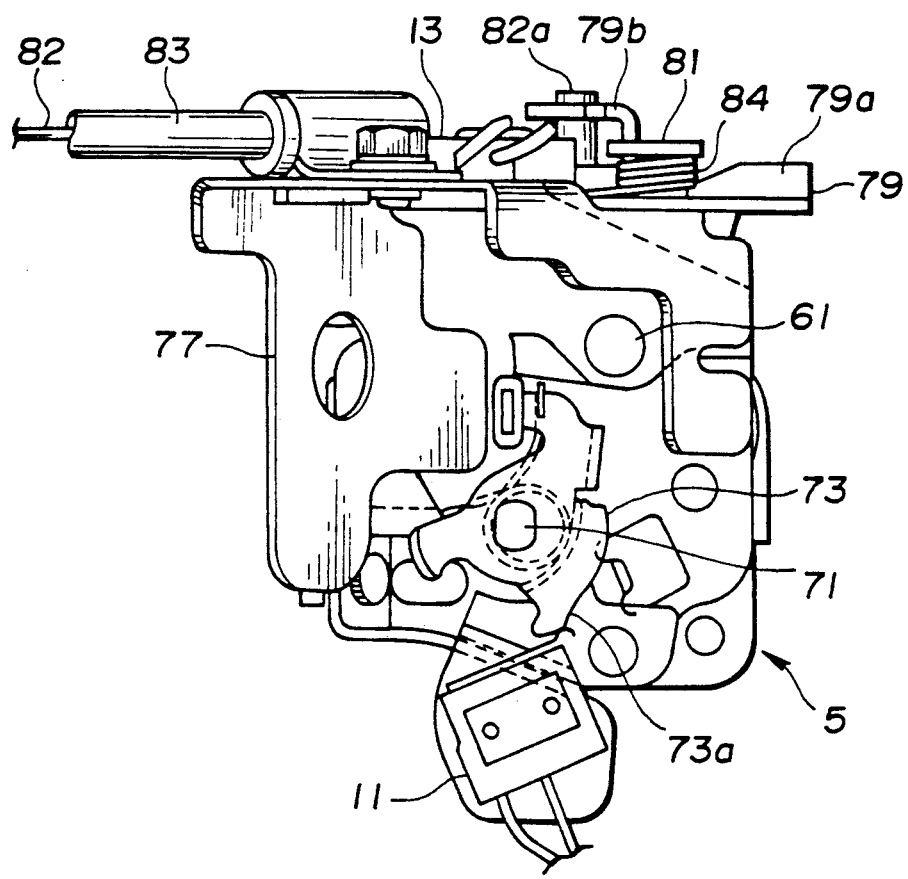
FIG. 8 is a view taken from the direction of the arrow "A" of FIG. 7.

As is seen from FIG. 8, the shaft 71 of the pawl member 69 is equipped at the other end with a generally triangular open lever 73. When the pawl member 69 comes to the block position, one projection 73a of the open lever 73 is brought into contact with and pushes a sensor arm (no numeral) of the half-latch detecting switch 11 which is mounted in the door 3. Upon this pushing, the switch 11 detects that the pawl member 69 has come to the block position.

In the disclosed embodiment, when, during a closing movement of the slide door 3, the projection 73a of the open lever 73 hits the sensor arm of the switch 11 at first, it is judged that the pawl member 69 has come to the block position. It is to be noted that the projection 73a hits the sensor arm twice during the turning of the latch member 63 from the release position "X" to the full-latch position "Z". Thus, if desired, a known technique may be employed in which the switch 11 is so constructed as to detect both the half-latch and full-latch positions "Y" and "Z" of the latch member 63 by sensing the two hits of the projection 73a against the sensor arm. Such technique is disclosed in, for example, U.S. patent application No. 07/659,576 filed on Feb. 22, 1991 in the name of Jun Yamagishi et al. In this case, the full-latch detecting switch 13 can be omitted.

As is known, the main function of the open lever 73 is to effect a lock cancelling operation of the door lock device 5 in response to operation of lock control devices such as outside door handle 75 (see FIG. 5), inside door handle and the like. Since the mechanism for achieving such a function is well known to those skilled in the art, detailed description of it will be omitted.

Referring back to FIG. 7, above the door lock device 5 in the door 3, a horizontal support plate 77 is tightly installed. To an upper surface of the support plate 77, a close lever 79 is pivotally connected through a vertical pivot shaft 81.

As is seen from FIG. 6, the close lever 79 is in the form of letter "L" and the pivot shaft 81 passes through a middle part of the lever 79.

As is seen from FIG. 7, the close lever 79 has one end 79a. When the close lever 79 is turned in a counterclockwise direction from an original position wherein the end 79a assumes a position as shown by a solid line, which is away from a travelling path of the arm portion 67 of the latch member 63 to an operative position wherein the end 79a assumes a position as shown by a phantom line, the end 79a of the close lever 79 abuts and pushes the arm portion 67 of the latch member 63 thereby to turn the latch member 63 from the half-latch position "Y" to the fulllatch position "Z".

The close lever 79 has a base end 79b to which a wire 82 is pivotally connected through a cylindrical connecting pin 82a. When the wire 82 is pulled by the electric drive mechanism 7, the close lever 79 is pivoted from the original position to the operative position.

Designated by numeral 83 is a guide tube in which the wire 82 is slidably received. A spring 84 is disposed about the pivot shaft 81 to bias the close lever 79 toward the original position. Designated by numeral 85 is a stopper against which a portion of the close lever 79 abuts when the same comes to the operative position. In practice, an arrangement is employed so that when the latch member 63 slightly exceeds the full-latch position "Z", the close lever 79 reaches to the operative position causing the full-latch detecting switch 13 to be operated.

Figure 9:
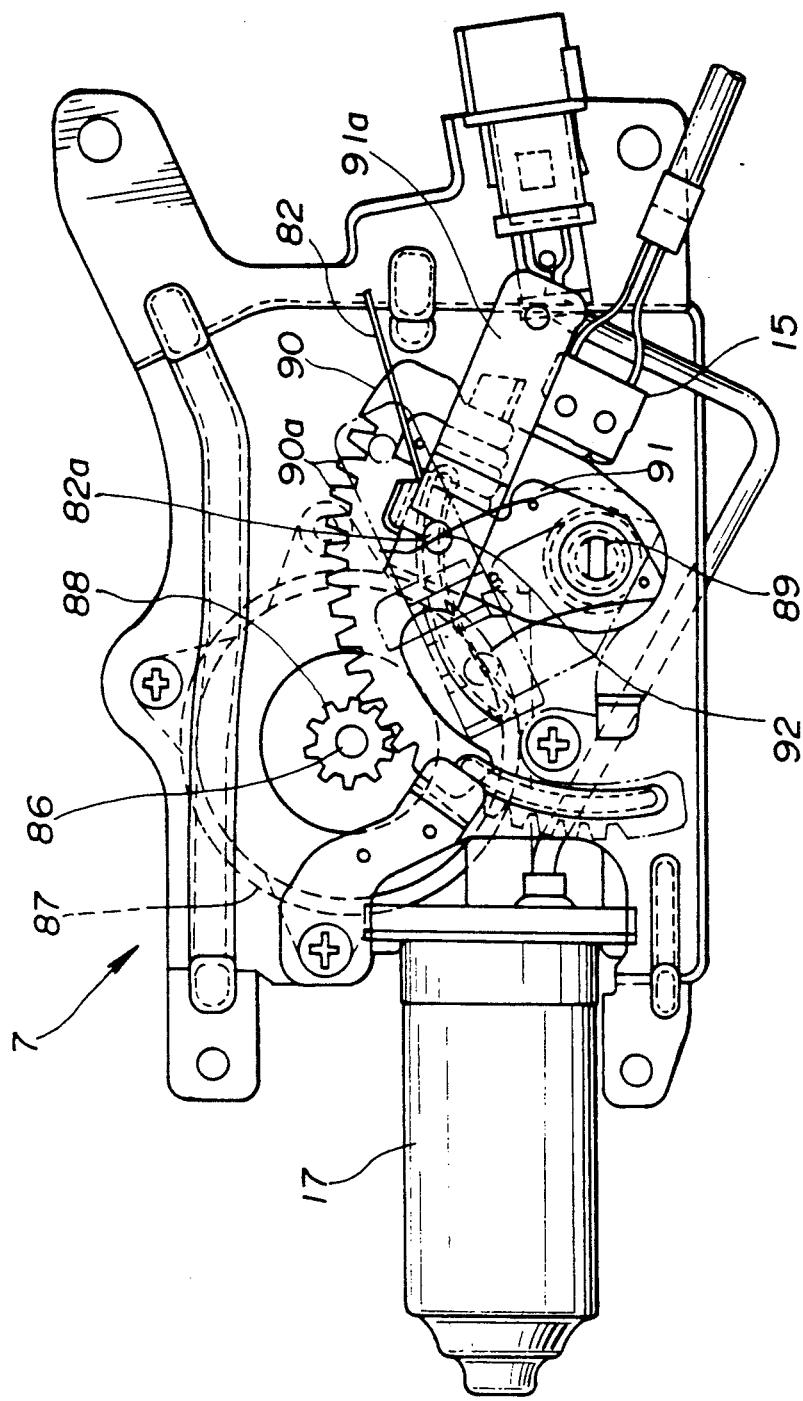
FIG. 9 is a side view of an electric drive mechanism for the door lock device.

The electric drive mechanism 7 is shown in detail in FIG. 9.

The mechanism 7 comprises a reversible electric motor 17 tightly disposed in the slide door 3. A power shaft of the motor 17 is connected to a speed reduction gear 87 which has an output shaft 86 whose rotation speed is lower than that of the power shaft of the motor 17. The gear 87 comprises, for example, a worm and a worm wheel which are meshed. A pinion 88 is tightly disposed about the output shaft 86 to rotate therewith. Meshed with the pinion 88 is an arcuate toothed portion 90a of a sector gear 90. The sector gear 90 is pivotal with a pivot shaft 89 which is in parallel with the output shaft 86 of the speed reduction gear 87. An actuating lever 91 is secured to the pivot shaft 89 to pivot together with the sector gear 90.

The actuating lever 91 has a leading end to which the other end of the wire 82 is pivotally connected through a cylindrical connecting pin 82a. For pivotally holding the connecting pin 82a, the actuating lever 91 has at the leading end a forked portion which comprises mutually faced two walls having aligned openings 92. The cylindrical connecting pin 82a is rotatably received in the aligned openings 92. One 91a of the two walls is formed longer than the other. Thus, when the wall 91a is flexed outward with a certain external force, the connecting pin 82a can be disengaged from the actuating lever 91. This, in turn, means an easy manual work for connecting the pin 82a to the actuating lever 91.

The aligned openings 92 are arcuate elongated slots which are concentric with the pivot shaft 89. Thus, even when, due to a long use, the wire 82 becomes slackened, such slack can be eliminated by repositioning the connecting pin 82a in the arcuate slots 92. Furthermore, due to the nature of the elongated slots 92, a damage of the wire 82 caused by repeated bending thereof is suppressed or at least minimized.

When, in the electric drive mechanism 7, the motor 17 is energized to run in a normal direction, a unit consisting of the sector gear 90 and the actuating lever 91 is forced to pivot in a counterclockwise direction (in FIGS. 1 and 9) from an original position about an axis of the pivot shaft 89. With this, the wire 82 is pulled by the actuating lever 91. While, when the motor 17 is energized to run in a reversed direction, the unit is forced to pivot in a clockwise direction toward the original position. With this, the wire 82 is returned to it original position. When the sector gear 90 is returned to the original position, the original position detecting switch 15 is actuated to stop the motor 17.

Figure 10:
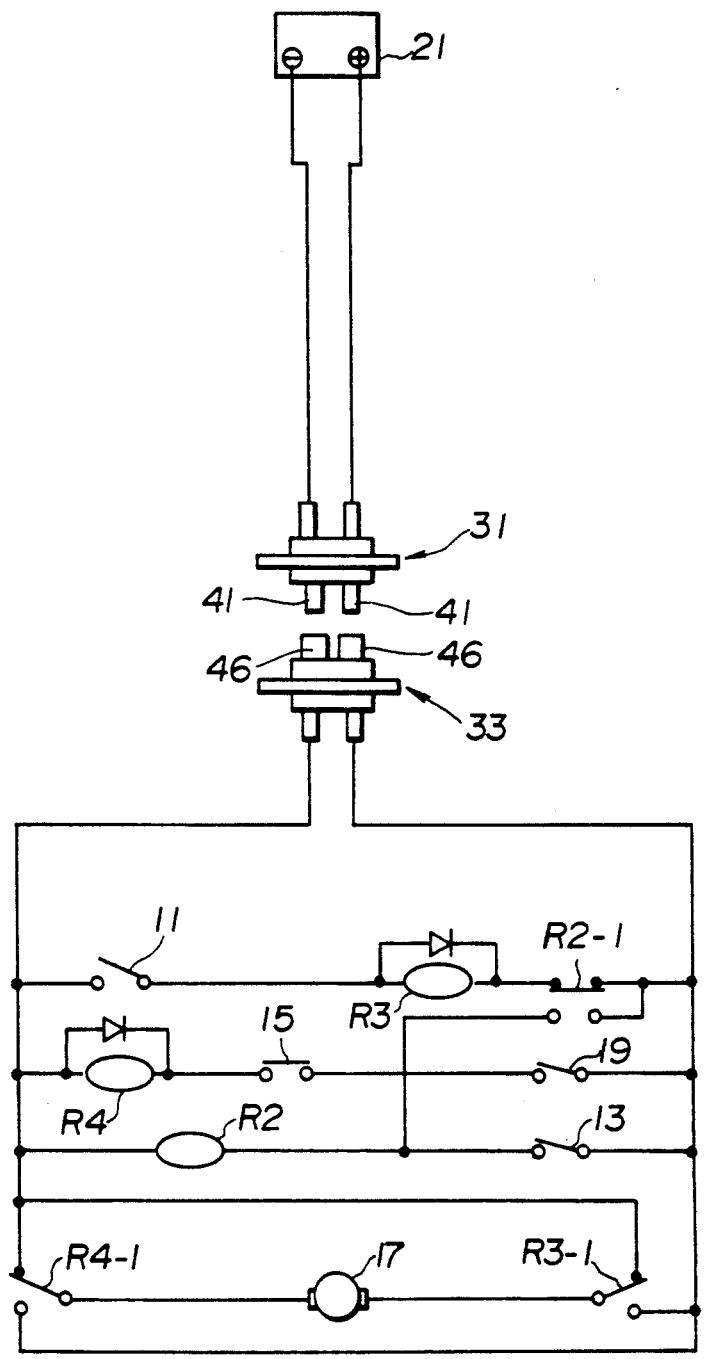
FIG. 10 is an electric circuit for controlling the electric drive mechanism.

FIG. 10 shows an electric circuit which controls the electric drive mechanism 7. In the drawing, R2, R3 and R4 are relays, and R2-1, R2-1 and R4-1 are movable contacts of the relays R2, R3 and R4.

When the slide door 3 is moved by manual labor in a closing direction from an open position to a position before the half-latch position, the electric connector 29 assumes a condition as shown in FIG. 1 in which the first and second connector parts 31 and 33 are completely separated.

Figure 2:
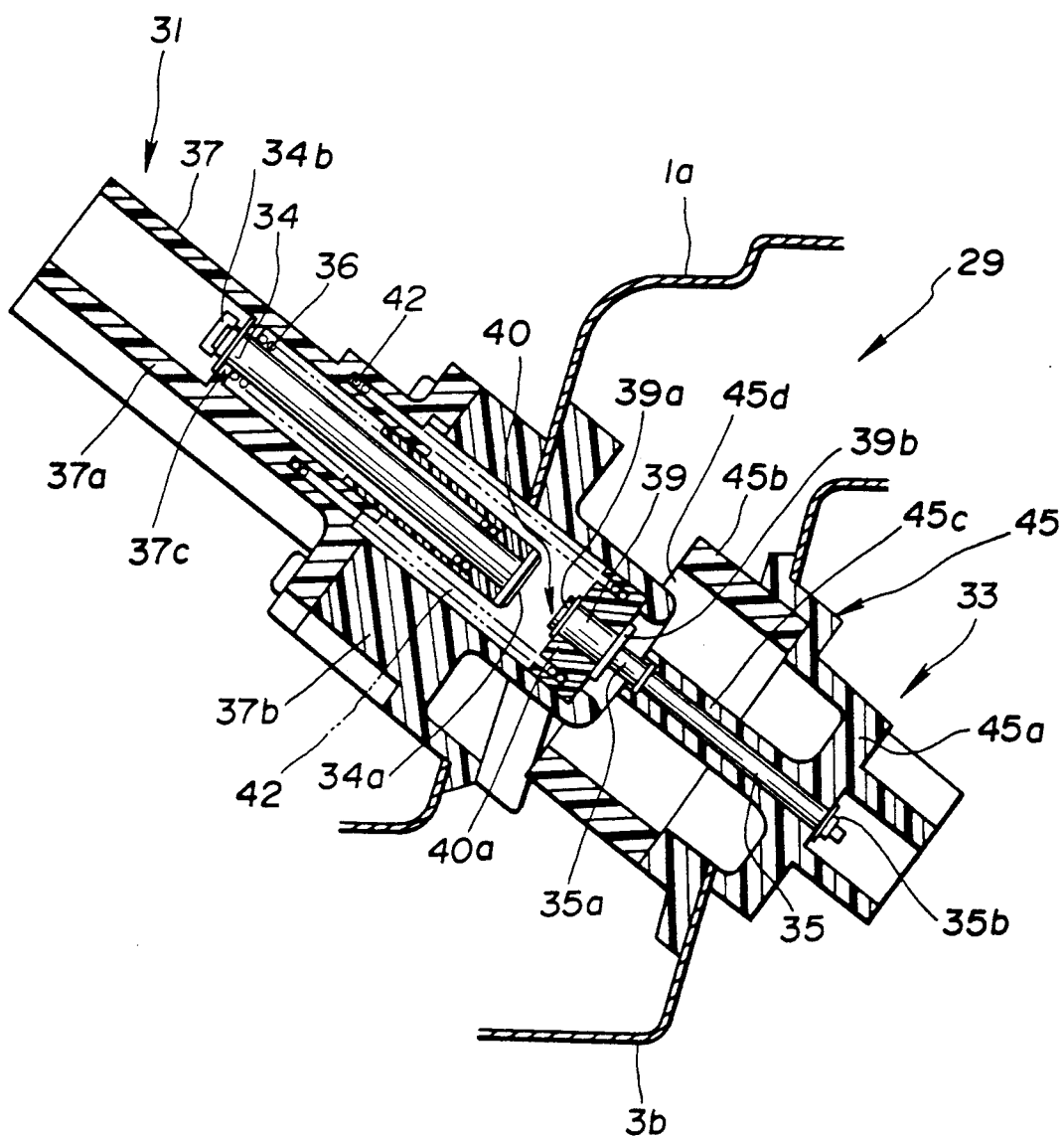
FIG. 2 is a view similar to FIG. 1, but showing a condition wherein the first and second connector parts are about to mate with each other.

When the slide door 3 is then moved to a position just before the half-latch position, the front ends 35a of the second contact pins 35 of the second connector part 33 are brought into abutment with the front ends 39b of the cylindrical pieces 39 of the first connector part 31, as shown in FIG. 2. Then, in accordance with the movement of the slide door 3 toward the half-latch position, the second contact pins 35 push the cylindrical pieces 39 toward the enlarged heads 34a of the first contact pins 34 of the first connector part 31 against the biasing force of the second spring 42.

When the slide door 3 is finally moved to the half-latch position, the electric connector 29 assumes a condition as shown in FIG. 3 wherein the cylindrical pieces 39 kept pushed by the second contact pins 35 are in abutment with the enlarged heads 34a of the first contact pins 34. Thus, upon this, electric connection between the first and second connector parts 31 and 33 is achieved and thus electric feeding from the battery 21 to the control device 9 becomes ready.

Upon the slide door 3 reaching the half-latch position, the latch member 63 of the lock device 5 is pivoted, causing the open lever 73 to hit the sensor arm of the half-latch detecting switch 11. Thus, the relay R3 is energized, causing its movable contact R3-1 to move to a normally open side. With this, the motor 17 is energized to run in a normal direction causing the electric drive mechanism 7 to pull the wire 82. Thus, the close lever 79 is forced to turn from the original position to the operative position, moving the arm portion 67 of the latch member 63. Accordingly, the latch member 63 is forced to turn from the half-latch position "Y" to the full-latch position "Z". Upon this, the slide door 3 is locked at its fully closed position.

When the latch member 63 reaches the full-latch position "Z" and the close lever 79 reaches the operative position, the full-latch detecting switch 13 is closed. Upon this, the relay R2 is energized causing its movable contact R2-1 to move to a normally open side, and thus, energization of the relay R3 is stopped, causing the movable contact R3-1 to move to a normally closed side. Because, under this condition, the close lever 79 and the sector gear 90 of the electric drive mechanism 7 are kept away from the original positions, and thus the original position detecting switch 15 is kept closed, the relay R4 is also energized, causing its movable contact R4-1 to move to a normally open side.

With this, the motor 17 is energized to run in a reversed direction, and the close lever 79 is returned to its original position. Because, under this condition, the latch member 63 is kept caught by the pawl member 69, the latch member 63 is prevented from being turned from the full-latch position "Z" to the half-latch position "Y".

When the close lever 79 and the sector gear 90 are returned to their original positions, the original position detecting switch 15 is opened, stopping energization of the relay R4, causing the movable contact R4-1 to move to a normally closed side. With this, energization of the motor 17 is stopped.

In the following, advantages of the electric connector 29 of the present invention will be described.

First, when the slide door 3 is kept opened, the cylindrical pieces 39 of the first connector part 31 are kept separated from the first contact pins 34 to which the electric cables from the battery 21 are connected. Thus, even when a conducting foreign article contacts the exposed front ends 39b of the cylindrical pieces 39, an undesired short circuit does not occur.

Second, when, upon full closing of the door 3, the connection of the first contact pin 34, the cylindrical pieces 39 and the second contact pins 35 is made with the aid of the biasing force produced by the first and second springs 36 and 42, the electric connection therebetween is assured.

What is claimed is:

1. An electric connector for use with first and second structures which are movable relative to each other, said electric connector comprising:
   a first connector part mounted to said first structure, said first connector part including:
      a first nonconducting casing,
      a first conducting contact pin axially movably received in said first casing,
      a nonconducting annular slider axially movably received in said first casing in front of said first contact pin,
      a conducting piece tightly held by said annular slider and having rear and front ends exposed from said annular slider,
      biasing means for biasing said first contact pin toward said conducting piece, and
      a coil spring which is arranged to receive therein said first contact pin and which biases said conducting piece away from said first contact pin; and
   a second connector part mounted to said second structure, said second connector part including:
      a second nonconducting casing, and
      a second conducting contact pin carried by said second casing;
   wherein when said first and second connector parts approach each other, an exposed end of said second contact pin contacts and pushes said conducting piece toward said first contact pin against a force of said coil spring and finally brings said conducting piece into contact with said first contact pin thereby establishing connection between said second contact pin, said conduction piece and said first contact pin.

2. An electric connector as claimed in claim 1, in which said first contact pin has a front half portion spacedly received in a nonconducting sleeve which is fixed to a head of said first contact pin.

3. An electric connector as claimed in claim 2, in which said head of said first contact pin is enlarged.

4. An electric connector as claimed in claim 3, in which said biasing means for said first contact pin is a coil spring which is disposed in a cylindrical space defined between said first contact pin and said sleeve.

5. An electric connector as claimed in claim 1, in which said second casing is formed with a hollow column in which said second contact pin is tightly received.

6. An electric connector as claimed in claim 1, in which said first contact pin and said conducting piece are coaxially aligned.

7. An electric connector for use with first and second structures which are movable relative to each other, said electric connector comprising:
   a first connector part mounted to said first structure, said first connector part including:
      a first nonconducting casing,
      a first conducting contact pin axially movably received in said first casing,
      a conducting piece axially movably received in said first casing in front of said first contact pin,
      first biasing means for biasing said first contact pin toward said conducting piece, and
      second biasing means for biasing said conducting piece away from said first contact pin; and a second connector part mounted to said second structure, said second connector part including:
  a second nonconducting casing which has a hollow column, and
  a second conducting contact pin which is tightly received in said hollow column, said hollow column having a front end positioned just below a front end of a mouth part of said second casing;
wherein when said first and second connector parts approach each other, an exposed end of said second contact pin contacts and pushes said conducting piece toward said first contact pin against a force of said second biasing means and finally brings said conducting piece into contact with said first contact pin thereby establishing connection between said second contact pin, said conducting piece and said first contact pin.

8. In a motor vehicle including a vehicle body, a slide door, a battery mounted in said vehicle body and an electric device mounted in said slide door, an electric connector comprising:
  a first connector part mounted to said vehicle body, said first connector part including:
    a first nonconducting casing,
    a first conducting contact pin axially movably received in said first casing,
    a nonconducting annular slider axially movably received in said first casing in front of said first contact pin,
    a conducting piece tightly held by said annular slider and having rear and front ends exposed from said annular slider,
    biasing means for biasing said first contact pin toward said conducting piece, and
    a coil spring which is arranged to receive therein said first contact pin and which biases said conducting piece away from said first contact pin; and
  a second connector part mounted to said slide door, said second connector part including:
    a second nonconducting casing, and
    a second conducting contact pin carried by said second casing,
  wherein when, due to a closing movement of said slide door, said second connector part approaches said first connector part, an exposed end of said second contact pin contacts and pushes said conducting piece toward said first contact pin against a force of said coil spring and finally brings said conducting piece into contact with said first contact pin thereby establishing connection between said second contact pin, said conducting piece and said first contact pin.

9. An electric connector as claimed in claim 8, in which said electric device mounted in said slide door is an electrically actuated door lock device.

* * * * *